July 14, 1931.  S. EINSTEIN  1,814,209

CENTERLESS GRINDING MACHINE

Filed Oct. 5, 1928   3 Sheets-Sheet 1

Inventor
Sol Einstein
By
Attorneys

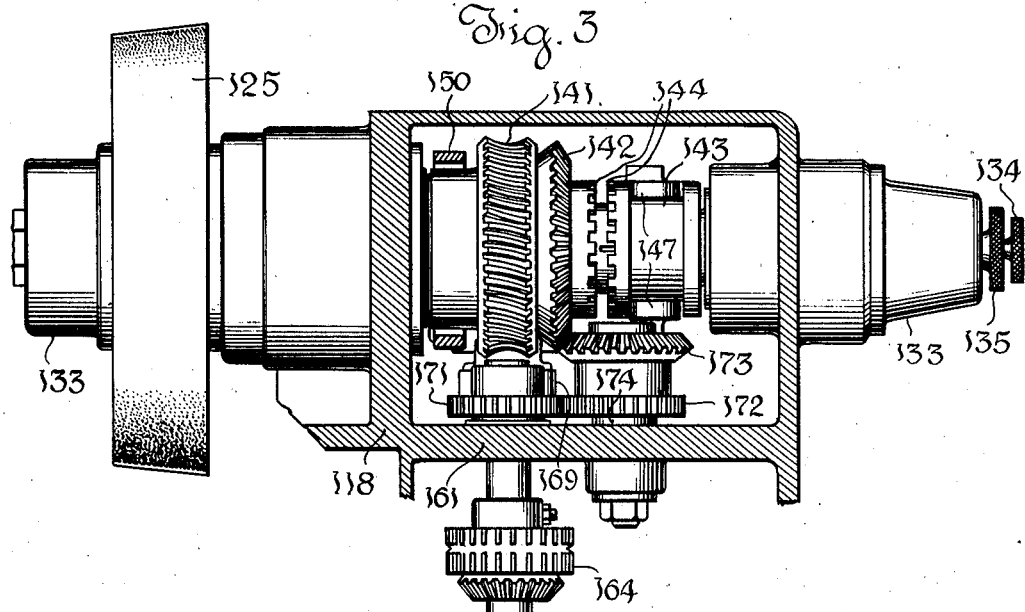
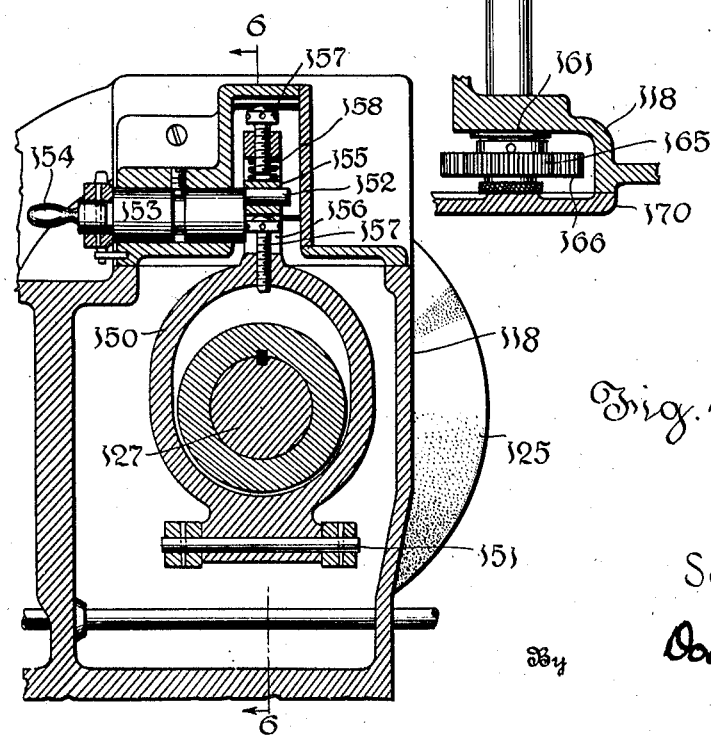

July 14, 1931.  S. EINSTEIN  1,814,209
CENTERLESS GRINDING MACHINE
Filed Oct. 5, 1928  3 Sheets-Sheet 3
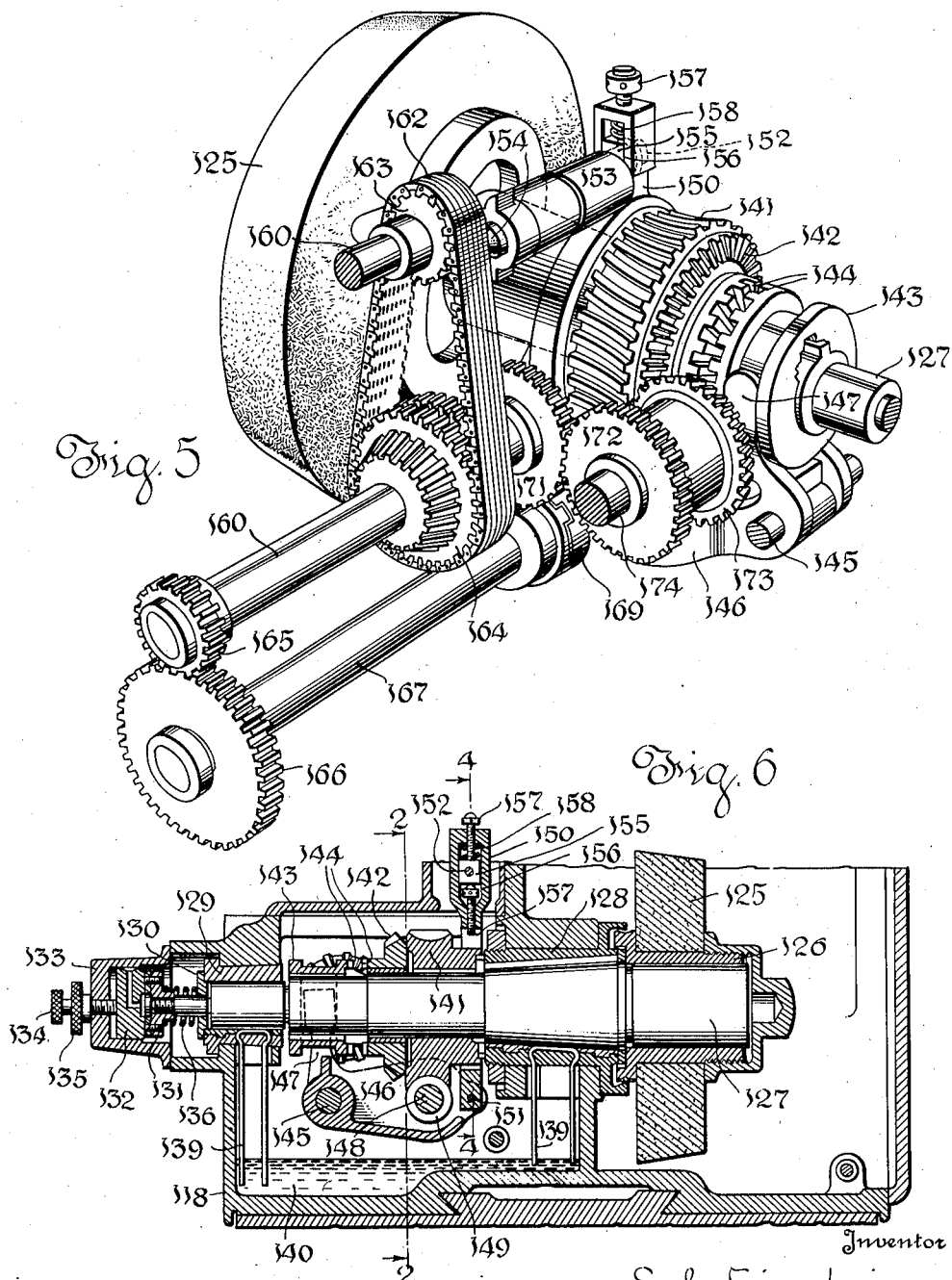
Inventor
Sol Einstein
By
Attorneys Patented July 14, 1931

1,814,209

UNITED STATES PATENT OFFICE

SOL EINSTEIN, OF CINCINNATI, OHIO, ASSIGNOR, BY MESNE ASSIGNMENTS, TO CINCINNATI GRINDERS, INCORPORATED, OF CINCINNATI, OHIO, A CORPORATION OF OHIO

CENTERLESS GRINDING MACHINE

Original application filed December 31, 1924, Serial No. 759,119. Divided and this application filed October 5, 1928. Serial No. 310,545.

This invention relates to centerless grinders and the present application is confined to the mechanism for driving the regulating wheel, being a division of application Serial No. 759,119, filed December 31, 1924.

Generally stated, a centerless grinder includes a work support, which guides the work, and two opposed abrasive wheels, one of which, the grinding wheel, rotates at high speed and does the grinding and the other of which, the regulating wheel, rotates at relatively low speed and regulates the rotation and the axial feed (if used) of the work piece.

In the machine disclosed in the parent application, the regulating wheel has an individual driving motor, and the wheel, motor and a variable speed transmission (as well as other mechanisms not included as a part of the subject matter of this application) are mounted on a separate carriage. Perhaps the most important feature of novelty here claimed is the use of a close-fitting worm and wheel to drive the regulating wheel during normal operation.

In the accompanying drawings,

Fig. 3 is a fragmentary section on the line 3—3 of Fig. 2.

Fig. 4 is a fragmentary section on the line 4—4 of Fig. 6.

Fig. 5 is a perspective view of the driving train for the regulating wheel.

Fig. 6 is a section on the line 6—6 of Fig. 4.

Figure 1:
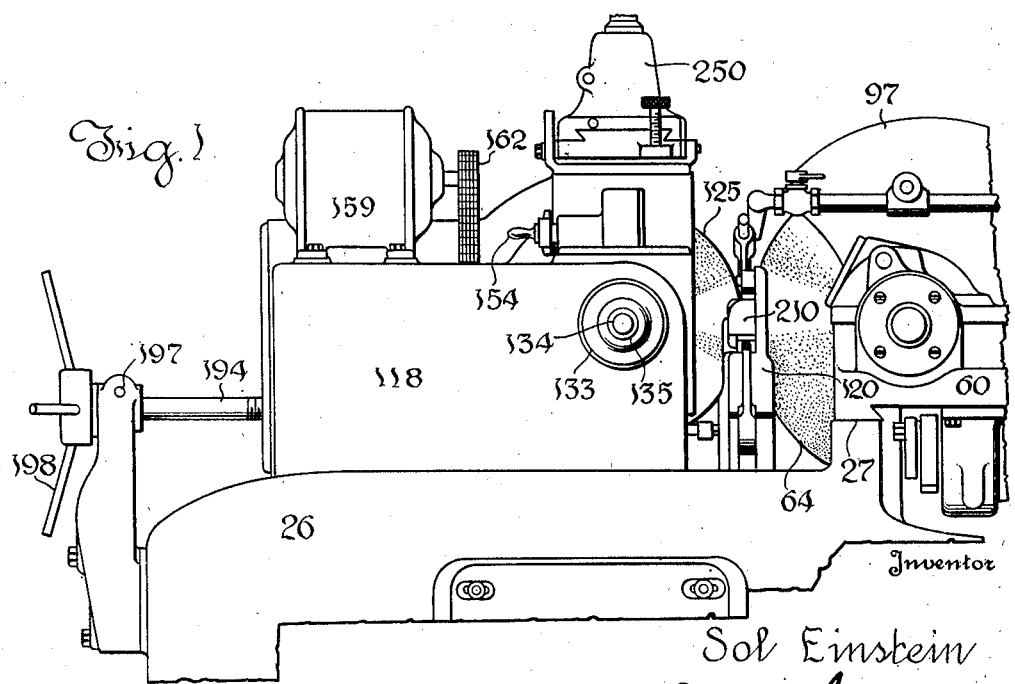
Fig. 1 is a fragmentary elevation of a grinder embodying my invention.

Refer first to Fig. 1.

The base of the machine is indicated generally at 26. This carries a guideway 27 for reciprocating carriage 60 on which the grinding wheel 64 is mounted. The wheel 64 is driven in any desired manner at appropriate speed and is shielded by a hood 97. The carriage is reciprocated to distribute the wear on the wheel and ensure maintained accuracy.

The regulating wheel carriage 118 is mounted in base 26 in any suitable manner and as shown is slidable toward and from carriage 60 by means of screw 194. While a power feed is provided manual adjustment is permitted and is effected by rotating screw 194 by means of wheel 198. The screw is normally locked by clamp 197.

The regulating wheel is identified by the numeral 125 and is mounted in carriage 118. The driving motor appears at 159 while 250 represents a truing mechanism whose structure is not involved in the present application. The parts 120 and 210 are elements of the work supporting and ejecting mechanism.

Referring now to Figs. 2 to 6 the details of the drive mechanism will be set forth.

The carriage 118 is a hollow casting formed with the necessary webs to stiffen it and to support the bearings of the regulating wheel and of the drive train therefor. The regulating wheel 125 is carried on a mount 126 which is fixed on the end of the control wheel shaft or arbor 127. (See Fig. 6). The arbor 127 is formed with suitable journals which are respectively mounted in a tapered main bearing 128 and in a second (cylindrical) bearing 129. Beyond the bearing 129 the shaft 127 is shouldered and carries, slidably splined thereon, a thrust collar 130 which bears against the outboard end of bearing 129. On the end of shaft 127 there is threaded a plain thrust disc 131 which turns against a thrust block 132 mounted in cap 133 which houses the end of shaft 127. The threads are so related to the direction of rotation of shaft 127 that disc 131 tends to screw onto the shaft when retarded by frictional engagement with block 132. The block 132 is held against rotation, but is adjustable in the direction of the axis of shaft 127 by means of thrust screw 134 and lock nut 135. A spring 136 surrounding the reduced portion of shaft 127 and held under compression between thrust disc 131 and thrust collar 130 tends to draw the tapered journal of shaft 127 into taper bearing 128 and this action is limited by the adjustment of thrust screw 134. In this way the shaft may be adjusted snugly in its bearings and yet may run without undue friction.

Bearings 128 and 129 are lubricated by capillary feeding wicks 139 which dip into a bath of oil 140 in the lower part of the carriage 118. Mounted on the shaft 127 between the bearings 128 and 129 are a worm wheel 141 of the close-fitting type keyed to the shaft 127, a bevel pinion 142 loose on the shaft, and a grooved clutch sleeve 143 axially shiftable on the shaft but splined thereto. The sleeve 143 and the hub of the pinion 142 are formed with complementary dental clutch members 144. The shifting of the clutch collar 143 toward and from the gear 142 serves alternately to clutch this gear to the shaft 127 and to release it therefrom.

Pivoted in the carriage 118 at 145 is a yoke 146 which is formed with an upstanding shipper fork 147 which engages the groove in the clutch collar 143 and serves to shift it into and out of clutching engagement with the hub. Journaled in the yoke 146 is a shaft 148 which carries a worm 149 in position to engage and drive the worm wheel 141 when the yoke 146 is drawn upward. The parts just described are so proportioned that the shifting of the yoke 146 about the axis 145 serves to carry the worm 149 into and out of engagement with the worm wheel 141, and at the same time disengage or engage the dental clutch which connects the gear 142 with the shaft 127. The worm drive is used in ordinary operations, the drive through the bevel gear being at much higher speed and being used only during the dressing or truing operation on the wheel 125.

Figure 2:
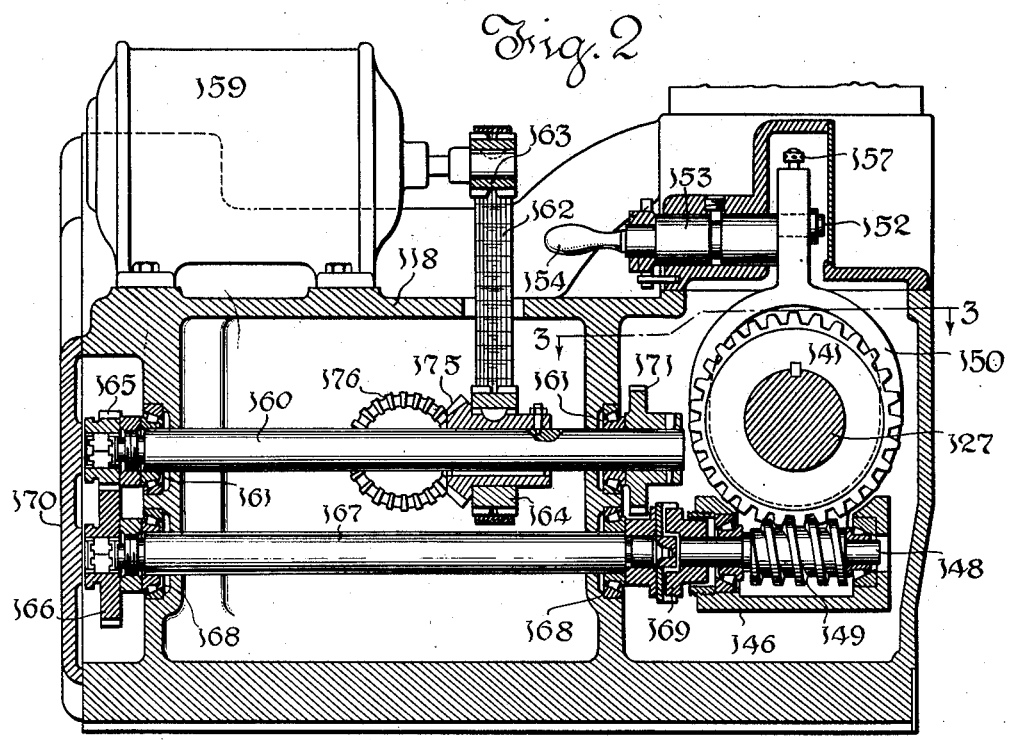
Fig. 2 is a section through the regulating wheel carriage on the line 2—2 of Fig. 6.

The shifting of the yoke 146 is effected by means of a stirrup member 150 pivoted at 151 to the yoke 146 and connected at its upper end to a crank pin 152 on the end of a shaft 153 which is rotated through approximately 180° by means of a crank 154 (see Figs. 2 and 4). The connection between the eccentric pin 152 and the stirrup 150 is not direct nor rigid, but is both yielding and adjustable. The pin 152 turns in a sliding block 155 guided in a slot 156 in the upper end of the stirrup 150. The range of movement of the block therein is adjustably limited by two capstan screws 157, and its upward thrust on the stirrup 150 is exerted through a coil spring 158 which surrounds one of the capstan screws and is confined above the sliding block 155 in the upper end of the slot 156. The effect is that the stirrup 150 exerts a yielding upward pull on the yoke 146 which draws the worm into close contact with its wheel and takes up all back lash and wear. This produces an irreversible drive of the regulating wheel and ensures absolutely smooth continuous rotation of the regulating wheel, a factor vital to successful work. In fact, the successful use of a worm drive for the regulating wheel is dependent on the use of a close fitting worm devoid of back lash.

The motor which drives the regulating wheel is shown at 159 and is mounted directly upon the regulating wheel carriage 118. This may be a constant speed motor in which change gears serve as the means for adjusting the speed of the regulating wheel, but the use of a variable speed motor offers still greater flexibility. The motor 159 drives the shaft 160, which is mounted in suitable bearings 161 in carriage 118 by means of a silent chain 162 running on the sprockets 163 and 164. The shaft 160 drives through change gears 165 and 166 a lower shaft 167 which turns in bearings 168 and which drives through an Oldham coupling 169 the shaft 148 upon which the worm 149 is mounted. The Oldham coupling 169 permits the shaft 148 to drop below the axis of the shaft 167 when the yoke 146 is lowered. When the worm 149 is meshed with its wheel 141, the shafts 167 and 148 are aligned, or substantially so. The change gears 165 and 166 may readily be slipped from the shafts 160 and 167 and other gears giving different ratios may be substituted. The gears are retained on the shaft by a cover plate 170 whose removal gives direct access to the change gears (see Fig. 2).

The pinion 171 (see Figs. 2 and 3) fixed on the end of shaft 160 drives a pinion 172 which is constructed integrally with the bevel pinion 173, the two being journaled upon a stub shaft 174 and the bevel pinion meshing with the bevel pinion 142 to drive the same. Thus pinion 142 is constantly driven when the motor 159 is running, but when the worm 149 is engaged with its worm wheel 141, the clutch members 144 are disengaged and the bevel pinion 142 turns idly on the control wheel arbor 127. There is a neutral position in which neither is engaged.

Various modifications may be made within the scope of the appended claims. The invention affords a positive drive for the regulating wheel which is smooth in action and devoid of any tendency to chatter or mark the work, as spur gear drives tend to do.

What is claimed:

1. The combination with a grinder having a regulating wheel, of an irreversible speed reducing drive therefor comprising a close-fitting worm and worm-wheel, the worm-wheel being rigidly connected with the regulating wheel; an adjustable stop serving to limit the closeness of engagement of said worm and worm-wheel; and resilient means urging said worm and worm-wheel together.

2. The combination with a grinder having a regulating wheel which runs at a low speed during grinding, but which must run at a higher speed for truing, of a variable speed drive for said regulating wheel comprising a worm and worm-wheel for the normal low speed drive and another drive for high speeds including a normally disengaged clutch; and means for actuating said clutch connected with said worm, and arranged to move the worm out of engagement with said worm-wheel as the clutch is moved toward engaging position.

3. The combination with a grinder having a regulating wheel which runs at a low speed during grinding, but which must run at a higher speed for truing, of a variable speed drive for said regulating wheel comprising a worm and worm-wheel for the normal low speed drive, and another drive for high speeds including a normally disengaged clutch; means for actuating said clutch connected with said worm, and arranged to move the worm out of engagement with said worm-wheel as the clutch is moved toward engaging position; and a spring operative when said worm and worm-wheel are engaged to urge them into close contact devoid of backlash.

4. The combination with a grinder having a regulating wheel which runs at a low speed during grinding, but which must run at a higher speed for truing, of a variable speed drive for said regulating wheel comprising a worm and worm-wheel for the normal low speed drive, and another drive for high speeds including a normally disengaged clutch; means for actuating said clutch connected with said worm, and arranged to move the worm out of engagement with said worm-wheel as the clutch is moved toward engaging position; a spring operative when said worm and worm-wheel are engaged to urge them into close contact devoid of backlash; and an adjustable stop for limiting the closeness of such engagement.

5. The combination with a grinder having a regulating wheel which runs at low speed during grinding and at a higher speed for truing, of a variable speed drive for said regulating wheel comprising a worm and worm wheel for the low speed drive, and a high speed drive including a clutch; a yoke in which said worm is rotatably mounted, said yoke being shiftably mounted to carry the worm into and out of engagement with the wheel; and a shipper for said clutch operatively connected with said yoke to disengage the clutch upon the movement of the worm toward meshing position.

6. The combination with a grinder having a regulating wheel which runs at low speed during grinding and at a higher speed for truing, of a variable speed drive for said regulating wheel comprising a worm and worm wheel for the low speed drive, and a high speed drive including a clutch; a yoke in which said worm is rotatably mounted, said yoke being shiftably mounted to carry the worm into and out of engagement with the wheel; a shipper for said clutch operatively connected with said yoke to disengage the clutch upon the movement of the worm toward meshing position; and an actuator for said yoke including yielding means for urging close engagement of the worm and wheel and an adjustable stop for limiting the closeness of engagement.

In testimony whereof I have signed my name to this specification.

SOL EINSTEIN.